United States Patent
Miles

(10) Patent No.: US 10,215,446 B2
(45) Date of Patent: Feb. 26, 2019

(54) INDUCED FLOW SOLAR THERMAL COLLECTOR AND METHOD

(71) Applicant: Mark W Miles, Atlanta, GA (US)

(72) Inventor: Mark W Miles, Atlanta, GA (US)

( * ) Notice: Subject to any disclaimer, the term of this patent is extended or adjusted under 35 U.S.C. 154(b) by 0 days.

(21) Appl. No.: 14/095,871

(22) Filed: Dec. 3, 2013

(65) Prior Publication Data

US 2014/0251311 A1 Sep. 11, 2014

Related U.S. Application Data

(60) Provisional application No. 61/732,685, filed on Dec. 3, 2012.

(51) Int. Cl.
*F24J 2/04* (2006.01)
*F24J 2/28* (2006.01)
*F24J 2/48* (2006.01)
*F24J 2/50* (2006.01)

(52) U.S. Cl.
CPC ........... *F24J 2/0483* (2013.01); *F24J 2/0488* (2013.01); *F24J 2/28* (2013.01); *F24J 2/48* (2013.01); *F24J 2002/508* (2013.01); *Y02E 10/44* (2013.01)

(58) Field of Classification Search
CPC .. F24J 2/0483; F24J 2/0488; F24J 2/28; F24J 2/48
USPC ...................... 126/390.1, 634, 658, 674, 676
See application file for complete search history.

(56) References Cited

U.S. PATENT DOCUMENTS

| 4,094,299 A | * | 6/1978 | Voelker | F03G 6/06 126/625 |
| 4,224,927 A | * | 9/1980 | Patil | C09D 5/32 126/675 |
| 4,296,741 A | * | 10/1981 | Harder | F24J 2/0477 126/658 |
| 4,478,210 A | | 10/1984 | Sieradski | |
| 6,533,554 B1 | | 3/2003 | Vargo et al. | |
| 2011/0120452 A1 | * | 5/2011 | Miles | F24J 2/1047 126/694 |
| 2012/0000530 A1 | | 1/2012 | Miles | |

* cited by examiner

*Primary Examiner* — Vivek Shirsat
(74) *Attorney, Agent, or Firm* — HM Law Group LLP; Vani Moodley, Esq.

(57) ABSTRACT

A solar thermal collector is provided. The collector comprises a housing defining an inlet, and an outlet for a heat transfer fluid, said housing comprising a window to allow sunlight to pass there through; a heat transfer core disposed within the interior of the housing said housing designed to be heated by exposure to said sunlight; and a heat absorbing component in proximity to the heat transfer core, said heat absorbing component designed to at least partially absorb heat losses from the heat transfer core; wherein a positioning the components within the housing defines at least one path for the heat transfer fluid for preheating of the heat transfer fluid prior to said heat transfer fluid passing through the heat transfer core.

17 Claims, 6 Drawing Sheets

INDUCED FLOW SOLAR THERMAL COLLECTOR AND METHOD

This application claims the benefit of priority to U.S. Provisional Patent Application No. 61/732,685, the entire specification and drawing of which are incorporated herein by reference.

FIELD

Embodiments of the invention relate to devices and methods to harness solar radiation as an energy source.

BACKGROUND

Solar thermal collectors are devices for converting sunlight into heat that can be used to perform work. They can fall into one or more categories including tracking (wherein the collector physically moves in order to follow the path of the sun to increase efficiency), non-tracking (wherein the collector does not track the path of the sun), and concentrating (wherein optics are used to concentrate the rays of the sun to increase performance).

One other characteristic of solar thermal collectors is their use of heat retention strategies to reduce heat loss to the environment to increase efficiency.

SUMMARY

According to one aspect of the invention, there is provided a method for heating a fluid, comprising:

allowing sunlight to pass through into an interior of a housing for a collector to a heat transfer core disposed within the interior of the housing, thereby to heat the heat transfer core;

transporting heat from the heat transfer core to an exterior of the housing by a heat transfer fluid entering the housing through an inlet and exiting through an outlet;

positioning a heat absorbing component in proximity to the heat transfer core, and at least partially absorbing heat losses from the heat transfer component by said heat absorbing component; and preheating the heat transfer fluid using heat captured by the heat absorbing component.

According to another aspect of the invention, there is provided a solar thermal collector comprising:

a housing defining an inlet, and an outlet for a heat transfer fluid, said housing comprising a window to allow sunlight to pass there through;

a heat transfer core disposed within the interior of the housing said housing designed to be heated by exposure to said sunlight; and a heat absorbing component in proximity to the heat transfer core, said heat absorbing component designed to at least partially absorb heat losses from the heat transfer core; wherein a positioning the components within the housing defines at least one path for the heat transfer fluid for preheating of the heat transfer fluid prior to said heat transfer fluid passing through the heat transfer core.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

In one embodiment, an induced flow solar thermal collector is disclosed. The collector includes a heat transfer core designed to be heated by sunlight, and a heat transfer fluid to transport heat from the heat transfer core to an external loop. Advantageously the collector includes a nano-porous medium which in cooperation with the heat transfer fluid may be used to capture heat lost through radiation and conduction, as will be described.

Figure 1:
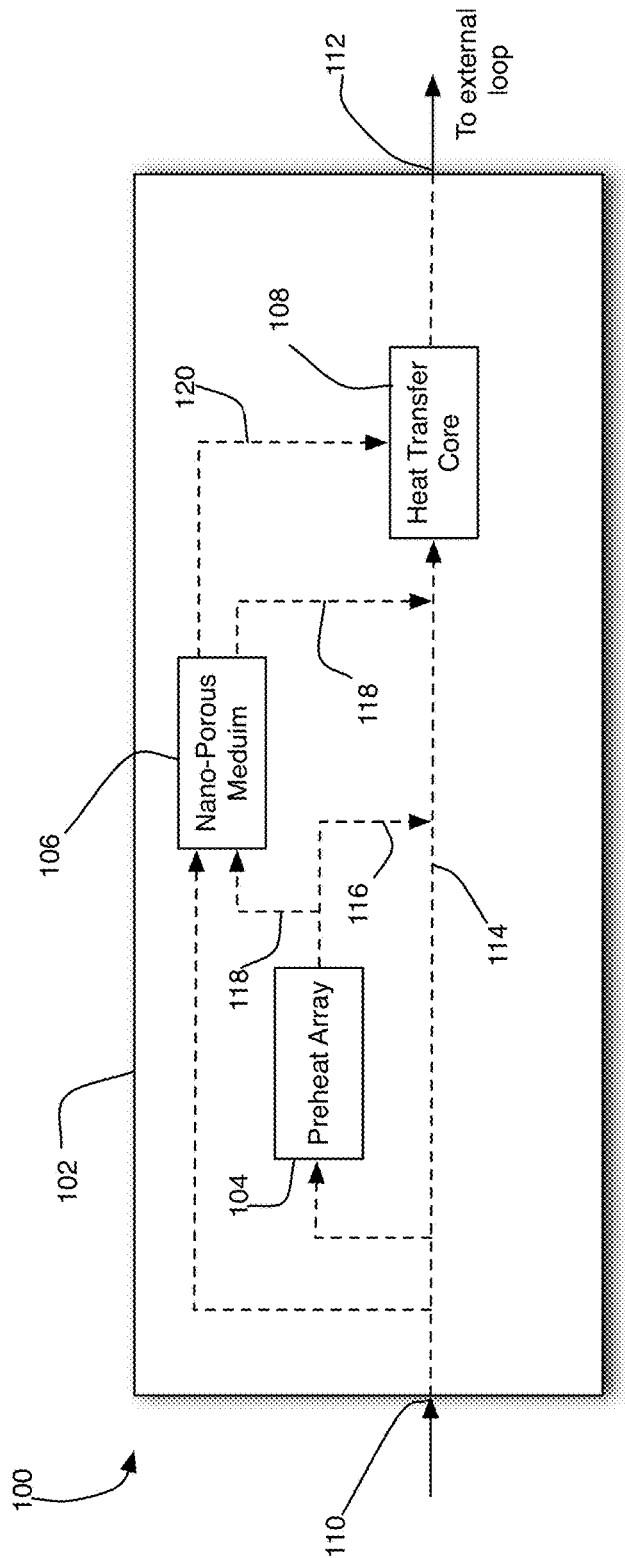
FIG. 1 is a schematic drawing showing various paths for a heat transfer fluid through an induced flow solar thermal collector, in accordance with one embodiment of the invention.

FIG. 1 shows a schematic drawing of an embodiment 100 of the induced flow solar thermal collector. As will be seen, the collector includes a housing 102 to house a preheat array 104, a nano-porous medium 106, and a heat transfer core 108. The construction and characteristics of each of these components will be described later. FIG. 1 is intended to illustrate various paths for a heat transfer fluid as it traverses the collector between an inlet 110 and an outlet 112. These paths include:

Path 114: which flows directly to the heat transfer core 108 from inlet 110 from where it exits the collector 100 via the outlet 112.

Path 116: which flows from the inlet 110 to the preheat array 104 and then to the heat transfer core 108 from where it exits the collector 100 via the outlet 112.

Path 118: which flows from the inlet 110 firstly through the preheat array 104, secondly through the nano-porous medium 106, and thirdly through the heat transfer core 108 from where it exits the collector 100 via the outlet 112.

Path 120: which flows form the inlet 110, to the nano-porous medium 106, and then to the heat transfer core 108, from where it exits the collector 100 via the outlet 112.

Figure 2:
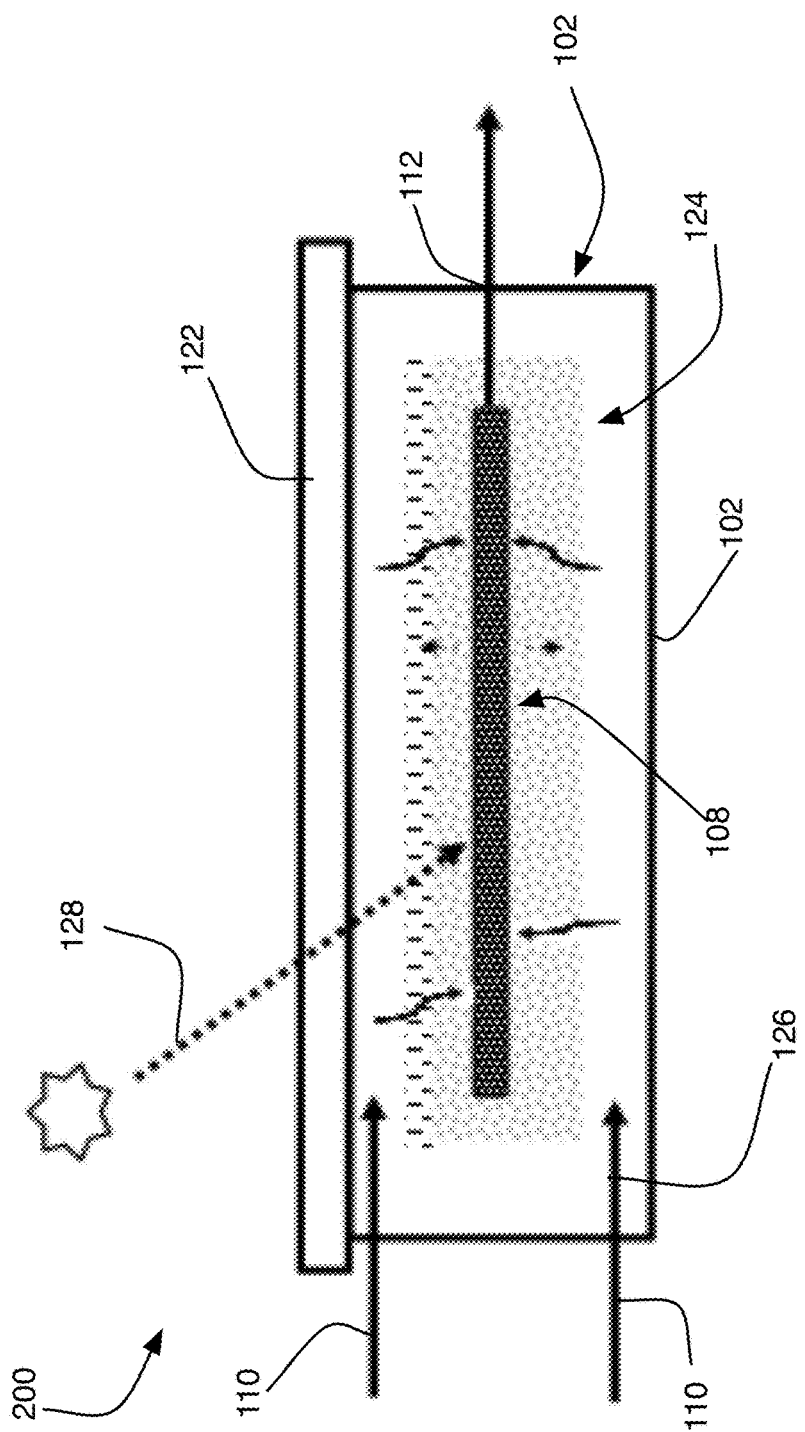
FIG. 2 shows a cross-section through an induced flow solar thermal collector with a heat transfer core immersed within a nano-porous medium, in accordance with one embodiment of the invention.

FIG. 2 shows a cross-sectional schematic drawing of an embodiment 200 of the induced flow solar thermal collector. Components of the collector 200 that are the same or at least similar to components of the collector 100 have been indicated with like or the same reference numerals. Referring FIG. 2, the collector 200 includes a collector housing 102 made from a material that can endure exposure to the natural environment for long periods of time. Housing 102 is thermally insulating by virtue of the materials it is comprised of as well as insulating materials which may be incorporated onto its interior. Such materials include but are not limited to, rock wool, granular aerogel, vacuum insulated panels, reflective metal films or metal coated plastics and some combination of these or other materials whose function is to minimize the escape of heat via conduction, convection, and radiation from the interior of the collector housing 102.

In one embodiment, housing 102 may be bonded and hermetically sealed to a transparent faceplate 122 such that air, moisture, or other elements from the natural environment many not enter the housing 102. In one embodiment, the transparent faceplate 122 may include a material such as a glass or a polymer that is substantially transparent to visible light and to some degree near infrared radiation. In one embodiment, said material may be low-iron glass. In some cases, polymers that are inherently resistant to UV exposure or UV resistant by virtue of a coating or the incorporation of UV inhibiting additives may also be used. In one embodiment, the transparent faceplate 122 may be coated with an anti-reflection coating to enhance the transmission of visible light.

In one embodiment, a heat transfer component 124 is located within the housing 102. The heat transfer component 124 includes a preheat array 104, a heat absorbing component in the form of a nano-porous medium 106, and a heat transfer core 108. Two inlets 110 are configured to allow a heat transfer fluid 126 into the housing 102. The heat transfer fluid 126 traverses the collector 200 by the various paths described in FIG. 1 and then exits the device through an outlet 112.

In one embodiment, the nano-porous medium 106 may comprise a silica aerogel, which is a porous glass-like medium characterized by a matrix of open cellular pores. The pores may have an average size ranges from 10's of nm to 100's of nm, in accordance with various embodiments. The aerogel is highly thermally insulating due to the fact that it substantially impedes the propagation of gas molecules through its volume and the fact that it is partially to substantially absorbing in mid to far infrared frequencies. In one embodiment, the required average pore size is determined by the operational pressure of the heat transfer fluid, the properties of the heat transfer fluid, and the desired properties of the aerogel.

The nano-porous medium 106 defines paths by which heat transfer fluid 126 may flow within the medium. The paths may include the pores of the medium itself, which are formed during its manufacture. In one embodiment, the paths may include fabricated pathways formed in the medium. In some embodiments, the fabricated pathways may be created at the same time that the medium is manufactured but are distinct and separate from the pores that are inherent to nano-porous medium 106. In other embodiments, the pathways may be formed in the nano-porous medium 106 after its manufacture.

In one embodiment, the preheat array 104 may comprise an array of physical structures which are configured to enhance the transfer of heat to the heat transfer fluid 126 flowing through the array and the nano-porous medium 106 with which it is in thermal contact (i.e. it is bonded to the preheat array 104 with minimal thermal resistance). Structurally, the preheat array 104 may comprise a plurality of fins, pins, or other features which increase the surface area of the array. In one embodiment, the preheat array 104 may be comprise a portion of the nano-porous medium 106, which has been molded during manufacture such that these features result. In some cases, the preheat array 104 may include a transparent material which is fabricated separately and then bonded to the nano-porous medium during assembly.

Functionally, the heat transfer core 108 includes a light absorption element and a heat transfer element. In one embodiment, the heat transfer core 108 comprises a corrugated element. In one embodiment, the corrugated element may comprise corrugated copper film into which fins have been embossed. The corrugated element defines the light absorption element. The corrugations or fins define the heat transfer element and has a geometry that increases the total surface area exposed to the heat transfer fluid 126 as it passes through.

In one embodiment, the fins may be coated with a light absorbing coating, which defines the light absorption element. The light absorbing coating, which can be made via many techniques well known in the art, serves to increase the absorption of visible light while simultaneously minimizing the amount of infrared radiation that is emitted by the heat transfer core 108.

During operation sunlight 128, is transmitted through the transparent faceplate 122 and is subsequently incident on the heat transfer core 108 where it is absorbed, resulting in heating of the heat transfer core 108. The heat transfer fluid 126 is admitted through the inlets 110 into the interior volume of the collector 200.

In one embodiment, the heat transfer fluid 126 is nominally a gas, which can include air, carbon dioxide or other candidates with suitable cost, and toxicity characteristics. The nominal pressure is slightly above atmospheric pressure though higher and lower pressures are possible.

As discussed in the flow diagram of FIG. 1, the heat transfer fluid 126 may traverse the collector 200 the various paths described with reference to FIG. 1.

When the heat transfer fluid 126 encounters the heat transfer core 108, the temperature of the heat transfer fluid 126 rises, the extent of which is determined by the strength of incident sunlight 128, the flow rate of the fluid, the geometry of heat transfer core 108, and other factors. The heat transfer fluid 126 functions to extract heat from the heat transfer core 108 and transports said heat to an external loop (not shown) as is flows out of the collector via the outlet 112.

One of ordinary skill in the art would appreciate that the heat transfer core 126 loses heat to the environment via conduction, convection, and radiation through the nano-porous medium 106 at a rate that will increase as the temperature of the core increases. In one embodiment, the collector 200 in configured to recover the lost heat by the incoming heat transfer fluid 126 in at least two ways.

Firstly, as the heat transfer fluid 126 passes through the preheat array 104, some portion of the lost heat which is transferred from the nano-porous medium 106 to the preheat array 104 will subsequently be transferred to the heat transfer fluid 126 via conduction.

Secondly, portions of the heat transfer fluid 126 which passes through the preheat array 104 and portions which do not flow through the preheat array 104 will both recover heat directly from the nano-porous medium 106 by virtue of flowing through the pores and through the fabricated pathways of the medium due to conduction. In this fashion the heat transfer fluid 126 undergoes preheating by retaining some of the heat that would normally be lost. The result is that the overall efficiency of the collector 200 is increased and higher operational temperatures may be maintained.

Figure 3:
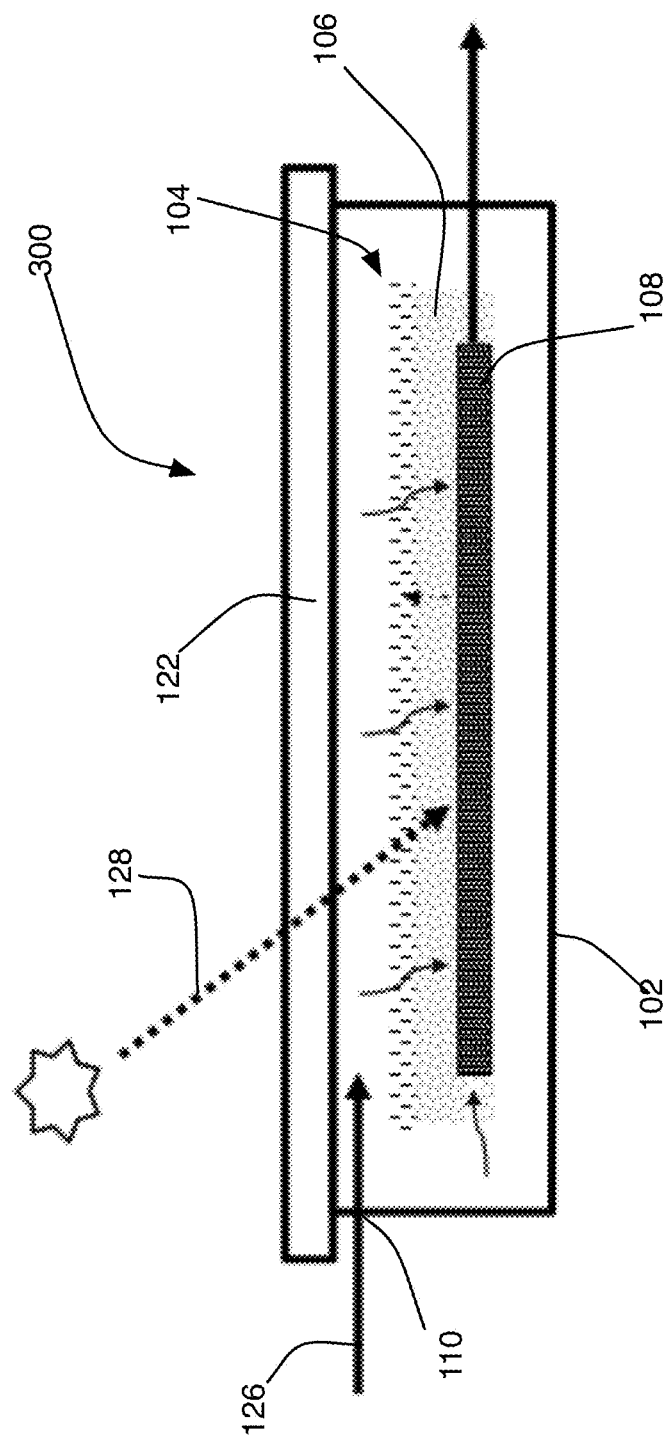
FIG. 3 shows a cross-section through an induced flow solar thermal collector with the heat transfer core adjacent to the nano-porous medium, in accordance with one embodiment of the invention.

FIG. 3 shows a cross-sectional schematic drawing of an embodiment 300 of the induced flow solar thermal collector. Components of the collector 300 that are the same or at least similar to components of the collectors 100 and 200 have been indicated with like or the same reference numerals. One difference between the embodiments 300, and 200 is that in the case of the embodiment 200, the heat transfer core 108 is no longer immersed within the nano-porous medium 106. Instead the heat transfer core 108 is located adjacent to the preheat array 104. With the embodiment 300, flow only occurs through the top of the nano-porous medium 106 via some combination of the paths described with reference to FIG. 1.

The embodiment 300 has the advantage of relying on the insulating properties of the housing 102 in conjunction with or without other insulating materials incorporated onto the interior of the housing 102, to minimize heat losses through the bottom of the collector. In all other ways the operation of the collector 300 is similar to the operation of the collector 200.

One of the characteristics of nano porous mediums is that they can act as thermally driven pumps under the appropriate circumstances. In particular if the average pore size is comparable to the mean free path of the gas suffusing the medium, the medium is sufficiently thermally insulating, and there is a thermal gradient applied to the medium, spontaneous pumping of the gas from the cold side to the hot side of the medium can occur. This phenomenon is known as thermal transpiration. Advantageously, the induced flow collectors disclosed herein can benefit from this pumping because of the similarities between its architecture and that of a transpiration pump. By absorbing the sunlight in the heat transfer core 108, a thermal gradient is established which can induce pumping or flow through the nano porous medium 106 towards the heat transfer core 108. The overall result and attribute is that the power required to pump the heat transfer fluid 126 through the collector is supplemented to some extent by the transpiration pump effect. The extent of the supplement is determine by factors which include the intensity of the thermal gradient, the size and size distribution of the pores within the nano-porous medium, and the characteristics and pressure of the heat transfer fluid 126 among other properties. In one embodiment the solar collector is thus designed and operated to enhance the effect of thermal transpiration in the pumping of the heat transfer fluid 126.

Figure 4:
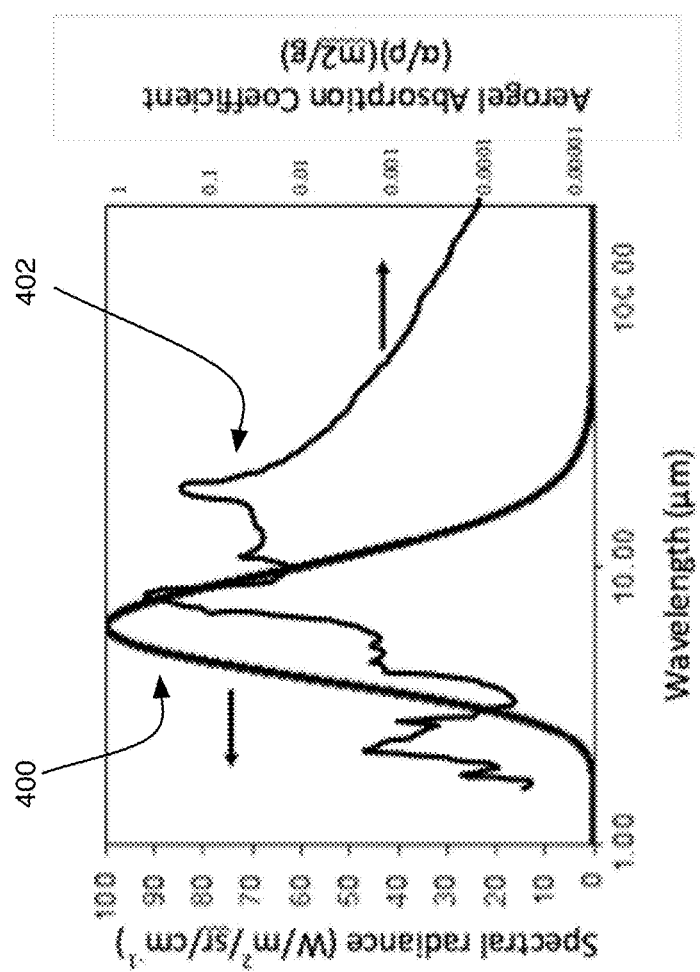
FIG. 4 is a plot that juxtaposes the IR emission of a blackbody against the IR absorption of aerogel.

Referring now to FIG. 4, a plot is shown which juxtaposes the emission characteristics of a black radiator, 400, at approximately 150° C. against the infrared absorption characteristics, 402, of aerogel. As can be seen, while the two curves do not overlap perfectly, the indication is that radiation from the emitter at wavelengths longer than approximately 7 microns will undergo significant absorption thus enhancing the aerogel's ability to capture radiative losses from an emitter, or in the case of the induced flow solar collector, from the heat transfer core.

In another embodiment, the solar thermal collector may be operated at a pressure which is lower than that of atmospheric pressure. The characteristics of the induced flow solar collector may be improved by reducing the pressure of the heat transfer fluid 126. This is due to the fact that within a nano-porous medium the overall thermal conductivity is dominated, within certain pressure limits, by the thermal conductivity of the heat transfer fluid 126. Thus reducing the pressure of the heat transfer fluid 126 and therefore its density has the effect of reducing the overall thermal conductivity of the medium and therefore heat losses to the environment.

Figure 5:
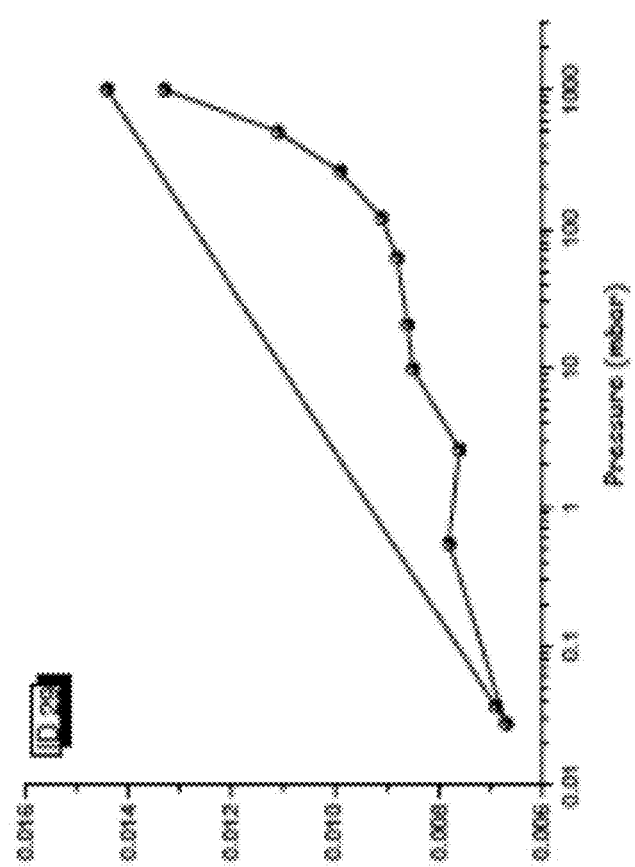
FIG. 5 is a plot the thermal conductivity of aerogel at versus air pressure.

Referring now to FIG. 5, a plot is shown which reveals the relationship between the thermal conductivity of aerogel and the pressure of the heat transfer fluid 126. It can be seen that reduced thermal losses can be realized down to pressure of approximately 0.015 mbar. Thus a lower operating pressure can improve both efficiency and operational temperatures of the collector.

In yet another embodiment the collector may be operated using a heat transfer fluid 126 in the form of a gas other than air.

Figure 6:
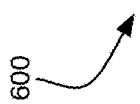
FIG. 6 is a table comparing the thermal conductivity of several gasses at atmospheric pressure.

Referring now to FIG. 6, a table 600 is shown which reveals the thermal conductivities of several candidate gasses for the heat transfer fluid 126. As can be seen there are a number of gasses with thermal conductivities which are lower than air. The utilization of one of these candidate gasses would consequently result in the improvement of the efficiency and operational temperature of the solar collector.

In yet another embodiment the solar collector may not include a preheat array 104 or an inlet 110 in direct fluid communication with the heat transfer core 108.

The invention claimed is:

1. A method for heating a fluid, comprising:
allowing sunlight to pass through into an interior of a housing for a collector to a heat transfer core disposed within the interior of the housing, thereby to heat the heat transfer core;
transporting heat from the heat transfer core to an exterior of the housing by a heat transfer fluid entering the housing through an inlet and exiting through an outlet;
positioning a heat absorbing component adjacent to the heat transfer core, and at least partially absorbing heat losses from the heat transfer core by said heat absorbing component;
wherein said heat absorbing component defines a plurality of distinct and separate paths through a porous medium for the flow of the heat transfer fluid as it traverses the collector between the inlet and the outlet across the length of the heat absorbing component; and
preheating the heat transfer fluid using heat captured by the heat absorbing component.

2. The method of claim 1, wherein preheating the heat transfer fluid comprises causing the heat transfer fluid as it is introduced through the inlet to pass through the collector via at least one path.

3. The method of claim 2, wherein the at least one path comprises a first path in which the heat transfer fluid passes through the heat absorbing component first before passing through the heat transfer core.

4. The method of claim 2, wherein the at least one path comprises a second path in which the heat transfer fluid passes through a preheat array first before passing thorough the heat absorbing component from where it passes through the heat transfer core; wherein said preheat array comprises physical structures configured to enhance transfer of heat to the heat transfer fluid.

5. The method of claim 4, wherein the at least one path comprises a third path in which the heat transfer fluid passes through the preheat array first before passing through the heat transfer core.

6. A solar thermal collector, comprising:
a housing defining an inlet, and an outlet for a heat transfer fluid, said housing comprising a window to allow sunlight to pass there through;

a heat transfer core disposed within the interior of the housing said housing designed to be heated by exposure to said sunlight; and a heat absorbing component adjacent to the heat transfer core, said heat absorbing component designed to at least partially absorb heat losses from the heat transfer core; wherein a positioning of the components within the housing defines a plurality of distinct and separate paths through a porous medium for the heat transfer fluid to traverse the collector between the inlet and the outlet across the length of the heat absorbing component, wherein at least one said path is for preheating of the heat transfer fluid prior to said heat transfer fluid passing through the heat transfer core; and wherein said heat absorbing component defines a plurality of paths for the flow of the heat transfer fluid.

7. The collector of claim 6, comprising a first path in which the heat transfer fluid passes through the heat absorbing component first before passing through the heat transfer core.

8. The collector of claim 6, further comprising a preheat array in thermal contact with the heat absorbing component; said preheat array comprising a plurality of physical structures configured to increase heat transfer to the heat transfer fluid.

9. The collector of claim 8, comprising a second path in which the heat transfer fluid passes through the preheat array first before passing thorough the heat absorbing component from where it passes through the heat transfer core.

10. The collector of claim 8, comprising a third path in which the heat transfer fluid passes through the preheat array first before passing through the heat transfer core.

11. The collector of claim 8, wherein said physical structures comprise a plurality of fins.

12. The collector of claim 8, comprising a first path in which the heat transfer fluid passes through the heat absorbing component first before passing through the heat transfer core; a second path in which the heat transfer fluid passes through the preheat array first before passing thorough the heat absorbing component from where it passes through the heat transfer core; and a third path in which the heat transfer fluid passes through the preheat array first before passing through the heat transfer core.

13. The collector of claim 6, wherein the heat absorbing core comprises light absorption component and a heat transfer component.

14. The collector of claim 13, wherein the light absorption component comprises a corrugated element.

15. The collector of claim 6, wherein the heat absorbing core is disposed wholly within the nano-porous medium.

16. The collector of claim 6, wherein the heat absorbing core is adjacent to the nano-porous medium.

17. The collector of claim 6, wherein the heat transfer fluid comprises a gas.

* * * * *